United States Patent [19]

Sayce et al.

[11] Patent Number: 5,735,928

[45] Date of Patent: Apr. 7, 1998

[54] APPARATUS FOR MANUFACTURING A VITREOUS SILICA ARTICLE

[75] Inventors: Ian George Sayce, Northumberland; Robert Nicholson, Tyne & Wear; Paul Willikam Turnbull, Northumberland; Peter John Wells, Tyne & Wear, all of United Kingdom

[73] Assignee: TSL Group PLC, United Kingdom

[21] Appl. No.: 553,701

[22] PCT Filed: Jun. 16, 1994

[86] PCT No.: PCT/GB94/01304

§ 371 Date: Dec. 5, 1995

§ 102(e) Date: Dec. 5, 1995

[87] PCT Pub. No.: WO95/00450

PCT Pub. Date: Jan. 5, 1995

[30] Foreign Application Priority Data

Jun. 18, 1993 [GB] United Kingdom ............ 9312634

[51] Int. Cl.⁶ ............................................. C03B 37/018
[52] U.S. Cl. ............................. 65/531; 239/422; 239/423
[58] Field of Search .................................. 239/422, 423, 239/566, 568; 65/531

[56] References Cited

U.S. PATENT DOCUMENTS

| | | |
|---|---|---|
| 3,086,851 | 4/1963 | Wagner . |
| 3,303,115 | 2/1967 | Nitsche . |
| 3,565,346 | 2/1971 | Carrell ............................ 239/422 |
| 3,806,224 | 4/1974 | MacChesney et al. . |
| 3,823,995 | 7/1974 | Carpenter . |
| 3,932,162 | 1/1976 | Blankenship . |
| 4,095,929 | 6/1978 | McCartney ..................... 239/422 |
| 4,113,844 | 9/1978 | Tokimoto et al. . |
| 4,136,828 | 1/1979 | Anderson et al. . |
| 4,148,621 | 4/1979 | Gliemeroth . |
| 4,165,915 | 8/1979 | Rau et al. . |
| 4,203,553 | 5/1980 | Bachman et al. . |
| 4,224,046 | 9/1980 | Izawa et al. . |
| 4,443,228 | 4/1984 | Schlinger ....................... 239/422 |
| 4,472,510 | 9/1984 | January . |
| 4,501,602 | 2/1985 | Miller et al. . |
| 4,682,994 | 7/1987 | Mansfield . |
| 4,747,772 | 5/1988 | Tsai ............................... 239/423 |
| 4,801,322 | 1/1989 | Suda et al. ..................... 239/422 |
| 4,804,247 | 2/1989 | Kyoto et al. . |
| 4,880,163 | 11/1989 | Kobayashi et al. ............ 239/422 |
| 4,975,102 | 12/1990 | Edahiro et al. . |
| 5,043,002 | 8/1991 | Dobbins et al. . |
| 5,152,819 | 10/1992 | Blackwell et al. . |
| 5,154,744 | 10/1992 | Blackwell et al. . |

FOREIGN PATENT DOCUMENTS

| | | |
|---|---|---|
| 476218 | 3/1992 | European Pat. Off. . |
| 3112820 | 5/1991 | Japan . |
| 3279234 | 12/1991 | Japan . |
| 1594919 | 8/1981 | United Kingdom . |

*Primary Examiner*—Henry A. Bennett
*Assistant Examiner*—Gregory A. Wilson
*Attorney, Agent, or Firm*—Howson and Howson

[57] ABSTRACT

A linear burner for the synthesis of silica by vapor-phase reaction of a silicon-containing feedstock in a flame comprises at least five slots opening to an exit face (52a) of the burner and extending side-by-side in the elongate direction of the linear burner, and includes means (P1–P10) to supply a separate gas flow to each of said slots. An assembly of separator plates (52) is disposed between opposed casing parts (50, 51), which assembly defines the slots. At least one of the casing parts (50, 51) defines at least part of a respective plenum chamber (54) for each gas flow, each plenum chamber (54) communicating with a different one of said slots in the separator assembly. The invention also extends to a method of operating such a linear burner.

21 Claims, 6 Drawing Sheets

APPARATUS FOR MANUFACTURING A VITREOUS SILICA ARTICLE

CROSS-REFERENCE TO RELATED APPLICATIONS

This is a 371 of PCT/GB94/01304, filed Jun. 16, 1994, which claims priority of UK patent application 9312634.0, filed Jun. 18, 1993.

BACKGROUND OF THE INVENTION

1. Field of the Invention

The manufacture of synthetic vitreous silica by soot deposition has been known for several decades. In the last 20 years, much progress has been made, stimulated by the need to prepare ultrapure and doped synthetic silica glasses for the manufacture of optical fibre. Two of the major processes which have emerged are;

(a) OVD (Outside Vapour Deposition)

(b) VAD (Vapour Phase Axial Deposition).

The OVD process involves the formation of a porous synthetic silica glass body by deposition of silica soot produced by one or more synthesis burners fed with fuel gas, oxygen and a source of silica vapour species, most commonly silicon tetrachloride but sometimes other halosilanes have been used. The plume of silica fume issuing from the burner or burners is directed to deposit silica soot on a mandrel or substrate, typically rotating about a horizontal or vertical axis. In some variants of the process, additional burners are used for soot consolidation, and for maintaining the temperature at each end of the soot body to prevent cracking.

Although the use of such a volatile silicon compound permits precise control of the purity of the deposited silica, care must be taken to avoid deposition of silica on the surface of the burner, as this may distort the flame, or block the exit ports of the burner. In the design of silica deposition burners it is essential to overcome this problem.

2. Description of the Related Art

A typical prior art burner is shown schematically at 10 in FIG. 1 of the accompanying drawings. The burner is made of metal with a central port 11 through which is projected a stream of silicon tetrachloride vapour, in an oxygen carrier gas stream. This central port is surrounded by one or more circular arrays of further ports 12, 13 which typically carry oxygen or premixed oxygen and methane, directed parallel to, or convergently with, the axis of the central port. The silicon tetrachloride is hydrolysed in the flame to form a plume of silica fume which is projected onto a mandrel or substrate made from alumina, graphite or silica to deposit as silica soot. The substrate may comprise a doped vitreous silica core rod which is to form the central component of an optical fibre preform.

In a typical prior art VAD process, the deposition occurs on the lower end of a vertically suspended and rotating silica soot body. Typically one burner deposits core material to form the axial region of a cylindrical soot body, and several further burners are used for depositing the cladding soot. The general design of one such burner comprises a series of co-annular quartz glass tubes defining a series of concentric annular slots through which the feed materials for the burner are supplied is shown at 20 in FIG. 2. Typically a central tube 21 is fed with silicon tetrachloride and oxygen, and successive annular slots (three of which are shown in FIG. 2 at 22, 23 and 24) are fed with, for example, argon, hydrogen or oxygen. A simple two- or three-slot burner may be surrounded by further annular slots creating additional hydrogen and oxygen sheaths, increasing the thermal output, lengthening the flame and promoting consolidation of the deposited soot.

Optionally, these annular slots may be separated by intermediate annular slots fed with inert gas e.g., argon, helium or nitrogen, to provide some cooling, for example to reduce the thermal load on the burner. Again, optionally, the burner may be supplied with an alternative fuel gas to hydrogen, such as methane.

The burners shown in FIGS. 1 and 2 produce an approximately cylindrical plume of silica particles which is impacted upon the substrate. The particles move towards the substrate under the influence of thermophoresis (motion of particles through a gas towards a region of lower temperature), and a proportion of the particles strike, and adhere to the substrate. The soot collection rate and collection efficiency of these known burners depend in part on the surface area over which deposition takes place. It is thus beneficial to deposit over as large a surface area as practical.

It is known in the operation of an OVD process to be beneficial to employ a large diameter substrate, and to employ an array of several burners. When operating an OVD process with a single burner, it is necessary to oscillate the burner to and fro along the full length of the substrate, but with an assembly of multiple burners, the assembly does not have to oscillate over the full length of the substrate, but merely over a fraction of the distance, sufficient to permit overlap of the deposits arising from neighbouring burners. Thus in JP-A-91279234, the use of three or more burners of similar size is described, for the deposition of synthetic silica soot along the length of an optical fibre preform rod. The burners, typically five in number, are equally spaced along the length of the substrate, and each is independently controlled according to a predetermined schedule, to seek to achieve uniform deposition of soot along the rod.

The use of an array of similar burners has been described also in EP-A-0476218, which describes the difficulties experienced in using linked arrays of burners, extending over the full length of the substrate and oscillated in a cyclic fashion of small amplitude, parallel to the long axis of the substrate. Problems arise in particular if these burners do not have identical deposition characteristics. It is stated in EP-A-0476218 that these difficulties are to some extent overcome by seeking to match the characteristics of each burner, and then continuously adjusting the end limits of the oscillation of the burner array, to minimise the frequency at which these end limits coincide from cycle To cycle. By controlling the inter-burner variability, and the air flow in the burner array and preform regions, it was said that preforms having substantially uniform axial properties can be obtained.

To deposit on a cylindrical article it would appear preferable to provide a sheet-like plume of silica fume which suggests a burner comprising an array of linear slots as opposed to the basically cylindrical plumes of the burners so far described. Such an arrangement has been described in JP-A-91112820, in which preforms were manufactured by soot deposition on the periphery of a cylindrical substrate, by using a plurality of multi-slit oxy-hydrogen burners, fed with silicon tetrachloride as silicon- containing feedstock, and arranged end-to-end along the length of the substrate. It is stated that this arrangement is superior to the use of a multiplicity of coaxial burners, since the latter suffer from mutual interaction of the burner flames. The burners described in JP-A-91112820 are said to be better than a single long slit burner which did not produce a sufficiently lengthwise uniform flame. The use of a multiplicity of burners nevertheless leads to added cost and complexity, especially as each may require a separate feed and control system.

The desirability of using a linear burner for soot deposition was noted many years ago. Early attempts at a simple ribbon or strip burner were described in U.S. Pat. No. 3,565,346, but problems arose due to deposition of silica soot on the face of this burner, and furthermore the burner was difficult to construct and consequently very expensive. An improved design was therefore proposed in U.S. Pat. No. 4,203,553, in which the reactant gas stream (e.g., silicon tetrachloride in oxygen) was directed from two linear arrays of orifices, into a central linear flame, issuing from a third linear array of orifices. Using this system, deposition on the working parts of the burner was said to be avoided, but the efficiency of deposition of silica upon the substrate was non disclosed, and this type of burner does not provide a laminar sheet-like flow of high concentration silica fume, which appears desirable for optimum deposition efficiency.

An alternative design of elongated burner was described in U.S. Pat. No. 4,136,828. In this burner the metal halide was injected into a pair of inwardly inclined linear flames. The burner comprised a central linear array of orifices supplied with silicon tetrachloride in oxygen, on each side of which was a linear array of closely spaced orifices providing jets of high velocity shield gas. Again on either side were two slots providing a large volume of non-reactive gas, and finally on each side was arranged a row of inclined jets providing premixed oxygen and fuel gas, yielding two linear and inwardly inclined flames permitting the flame hydrolysis of the silicon tetrachloride no occur.

This arrangement is again likely no be of low efficiency, due to the use of high velocity shield gas, of large volumes of inert gas, and to the use of high velocity inclined flames to provide the desired reaction. Each of these factors is detrimental to the situation sought, i.e. the production of a high concentration, low turbulence, sheet-like flow of silica species to impact upon a substrate serving as collection site. Furthermore the critical dimensions of the components of this burner can only be adjusted by expensive re-machining and reassembly (or by total replacement), and thus could be costly to optimise. The use of many fine orifices presents another disadvantage in that each is subject to blockage and would be difficult to clean. Finally there is no evidence of this burner having been used with a slot, or orifice array length of more than 10 cm (4 inches). The present invention seeks to provide a burner to achieve a uniform soot synthesis flame over a far greater burner length, and furthermore to operate efficiently and over a long period, not only with silicon halides, but also with halogen-free silicon-containing precursor vapour feedstocks.

The concept of a long linear burner has been described in U.S. Pat. No. 4,682,994, but this disclosure offers no solution to the problems of deposition of silica particles on the face of the burner. U.S. Pat. No. 4,682,994 implies the use of a homogeneous mixture of reagent gases, fed via two similar feed conduits to an array of parallel linearly-arranged orifices, to give a stream of silica particles of width similar to the diameter of the substrate, and a length many times greater than its width.

U.S. Pat. No. 4,682,994 speaks of a homogeneous flow of silica particles across the width of the flame but in practice it has been found that such an arrangement is far from ideal. We have found a superior and more efficient practice is to generate a high concentration of silica particles within a narrowly confined region of the flame (generally on the centre-line) and to surround this with high temperature gas, typically combustion products and free from silica particles. This arrangement provides a sheet-like flow of silica particles, surrounded on either side by parallel sheet-like flows of hot combustion product gases, and maximises the probability that a silica particle will reach the substrate and there adhere, and thus maximises the efficiency of the deposition process.

Some of the essential features of a practical linear silica synthesis burner are outlined below.

It is desirable to provide an array of orifices, ideally of parallel rectangular slots, to give parallel linearly disposed flows of reagent or inert gases, in a manner in which each flow is substantially uniform along the length of the burner.

It is preferable to synthesise silica particles at maximal concentration in the form of a thin sheet, typically on the centre-line of the burner.

It is desirable that an inner shield gas should surround the flow of silica precursor vapour, in order to prevent premature oxidation of the precursor, which might lead to deposition of silica on the face of the burner, and subsequent distortion of the flame, or blockage of the orifices.

It is preferable that the burner be of modular construction, and demountable, to permit interchange of critical parts and thus

- to facilitate the optimisation of the dimensions of the critical orifices particularly the widths of the slots,
- to pertain cleaning of any blocked orifices,
- to permit facile replacement of any corroded or damaged part.

It is desirable that the parallel flows of silica fume and combustion product gases be of low turbulence, in order to maximise the local concentration of fume particles, and to establish the controlled high thermal gradients which will optimise the conditions for thermophoretic flow of particles to the substrate.

There exists no published burner design which enables these various factors to be simultaneously achieved, either for burners supplied with conventional silica precursors (typically the halosilanes, and most frequently silicon tetrachloride), or for the halogen-free feedstocks such as for example silane, tetramethoxysilane (TMS, $Si(OCH_3)_4$), or the polysiloxanes, eg. hexamethyldisiloxane (HMDS, $(CH_3)_3SiOSi(CH_3)_3$), octamethylcyclotetrasiloxane (OMCTS, $((CH_3)_2SiO)_4$) etc., which may be preferred due to the absence of corrosive gases in the effluent gases, and to their ability to yield halogen-free glass product.

These halogen-free feedstocks are generally highly reactive with oxygen, requiring more care in burner design, if deposition of silica on the burner face is to be avoided. In a conventional burner, the silicon tetrachloride feedstock may be supplied to the burner mixed with oxygen as carrier gas. No reaction of these two gases occurs until the gases are well into the flame, and clear of the surface of the burner, since the mixture must be strongly heated to initiate the oxidation reaction, or alternatively must meet an adequate concentration of water vapour (a combustion product of the flame) to initiate the alternative hydrolysis reaction. Despite this, it has still proved difficult in the past to achieve even a short linear burner capable of long term use with silicon tetrachloride feedstocks (see U.S. Pat. No. 4,203,553).

These problems have been found to be considerably exacerbated when using combustible halogen-free silica precursors which burn with great intensity, immediately they emerge from the burner and meet oxygen. This property enables considerable savings in fuel gas relative to the use of conventional halosilane feedstocks, but presents severe problems in the design of suitable burners. The less expensive of these silica precursor feedstock materials also tend to have higher boiling points (eg. OMCTS, boiling point 176° C.) and, at the high loadings which are desirable in practice, it is necessary to preheat the burner to ensure that no condensation of precursor vapour occurs within the burner itself. This further enhances the reactivity of the vapour, and leads to considerable risk of thermal distortion of the components which may be used to manufacture the burner. Any such distortion leads to loss of control of flame structure, and again increases the risk of undesirable deposition of silica on the face of the burner.

The task of providing a linear burner for these new silica precursors has thus not proved easy, and it is surprising that it can be achieved in the design of the present invention, which has permitted the manufacture of burners capable of yielding uniform deposition of silica soot over a considerable length of substrate, from a continuous sheet-like flame of high aspect ratio supplied with the vapour of halogen-free precursors. It is understood furthermore that burners according to the present invention, which have proved satisfactory for the rigorous conditions of use with siloxane feedstocks, equally (with minor changes in dimensions, choice of gases, gas flows etc.) will prove satisfactory for use alternatively with silicon tetrachloride or other halosilane silica precursors.

SUMMARY OF THE INVENTION

One aim of the present invention is to enhance the build-up rate of a given deposition facility by employing one or more elongated deposition burners each of which deposits silica soot over a substantial length of a substrate surface. This aim is sought to be achieved in the present invention by the use of a burner having a plurality of separate supply channels for gas streams fed to the burner, each channel terminating in a finite elongate outlet slot, which slots are disposed side-by-side, substantially parallel to all the other slots in the burner. Such burners will hereafter be referred to as "linear burners", and generally comprise at least five slots. The slots (or the innermost five slots) together define an array from which gases emerge creating a primary synthesis flame in an efflux zone whose length in the elongate direction of the slots preferably has a ratio (aspect ratio) of at least 5:1 relative to the maximum width of the gas flows emerging from the plurality of side-by-side slots which define the primary synthesis flame. Advantageously the aspect ratio is at least 10:1 and preferably at least 50:1. A linear burner in accordance with this invention may be made from fused quartz, vitreous silica or ceramic material, or alternatively from metal components, which can be accurately formed or machined, and parts of which may be readily dismantled, cleaned or replaced whenever required.

A particularly important feature of this invention arises from a method of using a linear burner with a halogen-free silicon-containing feedstock to create a synthetic silica soot deposit on a suitable substrate.

BRIEF DESCRIPTION OF THE DRAWINGS

The invention will now be further described, by way of example, with reference to the accompanying drawings, in which.

DESCRIPTION OF THE PREFERRED EMBODIMENTS

A burner in accordance with the invention may be used for the deposition of silica soot along a linear zone from a feedstock such as silicon tetrachloride or other halosilane. For this application a simple burner such as that shown in FIG. 3 can be used with five side-by-side elongated slots terminating in five gas supply channels, where channel 31 is fed with $SiCl_4/O_2$ channels 32 and 32A are fed with oxygen, and channels 33 and 33A are fed with hydrogen.

Figure 1:
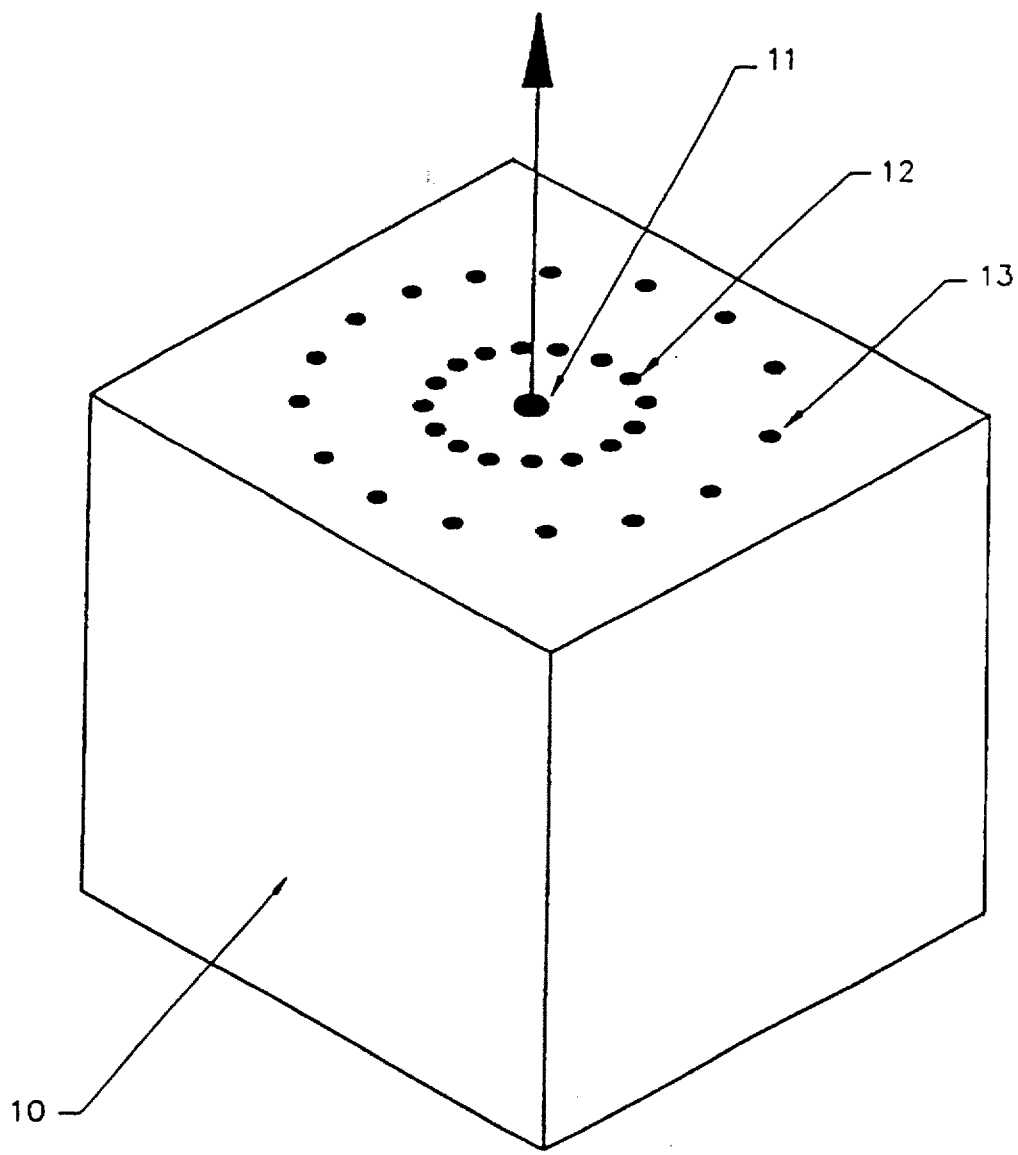
FIGS. 1 and 2 are the prior art burner constructions already discussed.
Figure 2:
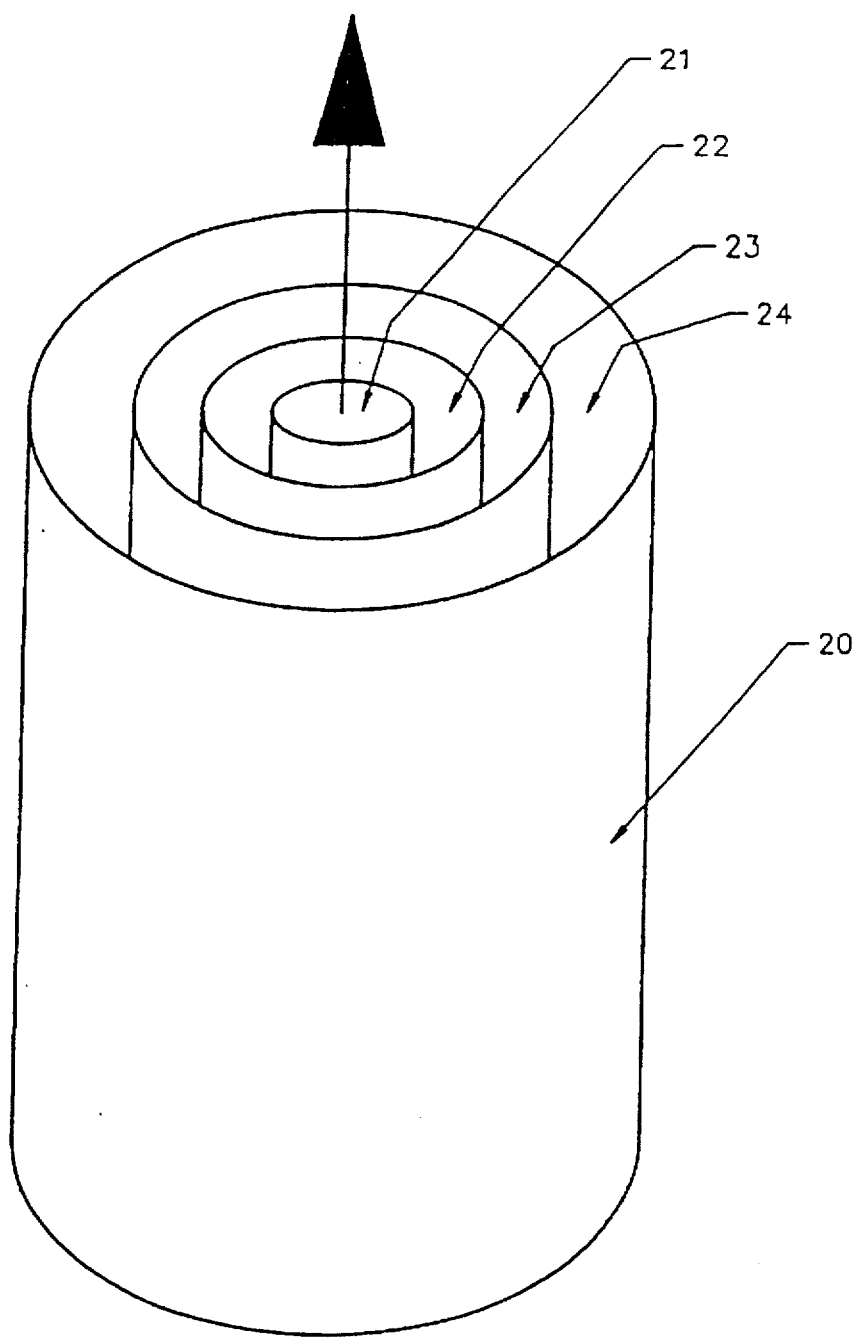
Figure 3:
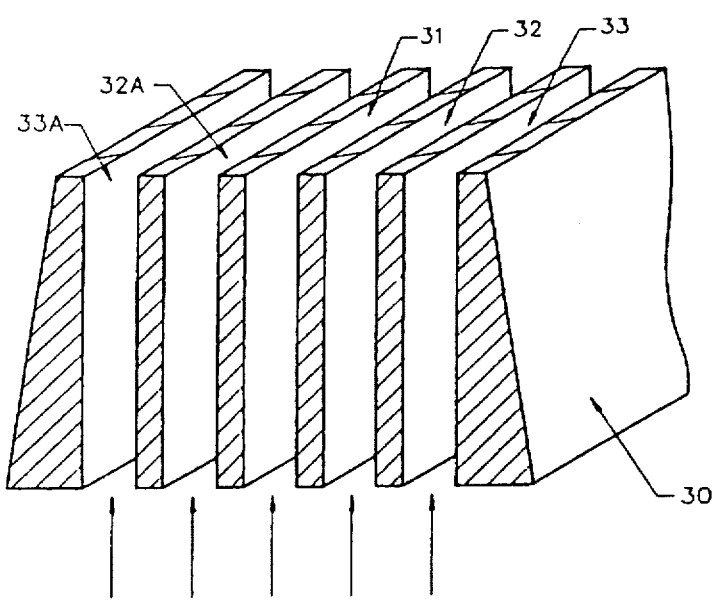
FIGS. 3 and 4 are schematic views of two embodiments of linear burners in accordance with the invention.

The linear burner 30 shown in FIG. 3 is of symmetrical design, i.e., the channels 32, 32A terminate in elongate slots of equal width and this is preferred. In practice each channel 32, 32A will conveniently be fed with equal volumes of oxygen. Channels 33 and 33A likewise conveniently provide equal width outlet slots and are suitably fed with equal volumes of hydrogen. As described, the burner 30 provides a symmetrical flame, with the silica precursor introduced to the central channel 31, however it is possible to provide a linear burner within the scope of this invention which comprises finite slots with differing widths and/or symmetrically located pairs of finite slots which are fed with differing volumes of the respective gases or even with different gases, in order, for example, to achieve a specifically desired deposition temperature or temperature distribution.

It is preferable that the dimensions of the outlet slots of the channels and volume flows of the respective gases through those channels be such as to achieve a sheet-like plume of silica fume which is of low turbulence, since excessive turbulence dilutes the plume and lowers the efficiency of the collection with regard to the soot product.

A burner in accordance with the present invention has particular utility when used for silica soot deposition from one of a number of commercially available halogen-free silicon-containing vapour feedstocks which burn in oxygen to give silica fume. The linear burner may be fed with silane, with alkoxysilanes e.g., $Si(OCH_3)_4$, or with other vaporised silicon compounds, for example any of a range of siloxane-containing compounds, i.e., which incorporate the atomic grouping Si—O—Si. Siloxane feedstocks include such simple species as hexamethyldisiloxane, $(CH_3)_3Si$—O—Si$(CH_3)_3$, and more complex polysiloxanes including such linear molecules as are covered by the general formula $R_3Si.O.(SiR_2O)_m.SiR_3$ where m is any integer including zero, and also such cyclic molecules as are covered by the general formula $R_{2n}Si_n.O_n$ where n is greater than 2, and R in the above examples represents one of a series of possible substituent groups selected from i) an alkyl group of the general formula

$C_pH_{2p+1}$ where p is an integer greater than zero, and ii) the hydride group

H—.

The burner 30 shown in FIG. 3 may be used for deposition, on a cylindrical substrate, of soot made by combustion of a halogen-free silicon-containing vapour. Channel 31 is fed with silicon-containing vapour, optionally diluted with a carrier gas which may be inert, e.g., argon, nitrogen, or a combustible gas, e.g., hydrogen or methane. Channels 32 and 32A are fed with a combustible gas, e.g., hydrogen or methane, optionally diluted with inert gas, or with inert gas alone, and channels 33, 33A are fed with oxygen. The entire burner can be manufactured from metal components and at least the boundaries of channel 31 can be maintained at a temperature above the dew point of the silicon-containing feedstock to prevent condensation of feedstock within the burner.

Figure 4:
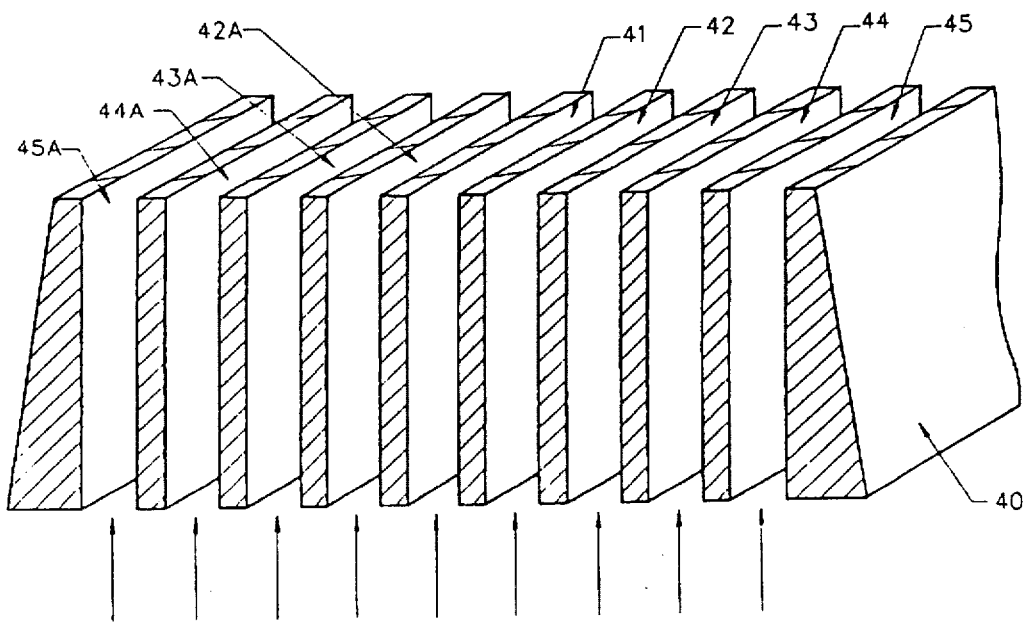

FIG. 4 shows a nine channel burner 40 which may be provided with gases as follows. A central slot 41 is fed with a vapour of an appropriate combustible halogen-free compound of silicon, optionally mixed with a carrier gas, e.g., nitrogen or hydrogen. The next adjacent slots 42, 42A, are fed with inert or combustible gas, e.g. hydrogen, methane, or nitrogen, i.e. with a gas which does not oxidise the silicon compound. The next adjacent slots 43, 43A are fed with oxygen, slots 44, 44A are fed with a combustible gas, e.g. hydrogen or methane, and slots 45, 45A fed with oxygen.

Additional channels may be fitted to either of the above described linear burners if required, e.g., to increase the width or intensity of the flame, or to introduce inert gas between neighbouring flows of combustible gas and oxygen (to reduce the thermal load on the intervening separators). It may also be advantageous to include two outer channels carrying e.g., oxygen or inert gas, to provide an overall gas shield, reducing the risk of contamination of the deposition zone by ambient gases, but not necessarily contributing to the chemistry of the process.

It may additionally be advantageous to arrange that some or all of the outer flows be convergent, i.e. the separator assembly may be designed to ensure that the planiform gas streams emerging from parallel sloes at the face of the burner are arranged to converge, after emerging, toward the central axial plane of the burner, stimulating mixing of the reactant streams as opposed to relying on mutual interdiffusion, as when the gas streams emerge in a purely axial direction. Such convergence may be achieved by arranging that some or all of the separators are of tapered cross-section, being thinner at the outlet of the resulting slot, i.e. at the hot face of the burner.

Alternatively or additionally some or all of the combs may be of tapered cross-section, becoming thinner toward the hot face of the burner. Such an arrangement leads to a progressive increase in cross-sectional area of the resulting slot in the direction of flow of the gas, and may be employed for example to reduce the small-scale variations of the flow induced by the individual comb-teeth.

Asymmetrical burners may be preferred for certain applications, but it is a particular advantage of the present invention that the linear burner may be used to deposit silica soot over a substantial length of substrate.

When used with a combustible halogen-free silicon compound feedstock, advantageously polysiloxane vapour, a significant part of the thermal energy of the flame may be provided by combustion of the silicon-containing feedstock.

The present invention provides a solution to the problems and deficiencies exhibited by prior art burners in a convenient and practical design, capable of use with conventional halosilane feedstocks, and more importantly capable of use with the more novel combustible halogen-free silica precursors, which have not previously been used with linear burners. The concept is capable in principle of providing any number of parallel gas flows emerging from a series of parallel slots at the face of the burner. For the purpose of illustration one embodiment is exemplified in FIG. 5, which shows a burner comprising nine parallel slots suitable for deposition of silica from a flow of polysiloxane vapour, but it is to be understood that the design concept is highly versatile, and, for example, by modifying the dimensions, or varying the number of parallel slots, a wide variety of feedstocks, including halosilanes, silanes, alkoxysilanes, and polysiloxanes, and inert and reagent gases may be accommodated.

The construction of a preferred modular burner in accordance with the present invention will now be described with reference to FIG. 5. The basic components of each module are a pair of plenum blocks 50, 51 which comprise two halves of the burner body, a series of "separators" 52, each of which may be a rectangular sheet of metal of appropriate composition such that the downstream edge of such a separator withstands the high temperature conditions prevailing at the base of the linear flame, and a series of "combs", 53, each of which is a comb-like component, cut from a sheet of metal, or otherwise constructed, which holds apart neighbouring separators 52, and thus provides an array of linearly disposed passages each feeding a slot at the exit face 52A of the burner from which the gas emerges. A combination of such slots provides the efflux zone at the exit face of the burner where the gases combine to generate the required silica synthesis flame.

In a preferred variant of this invention, each comb 53 may be an integral part of a neighbouring separator 52, i.e. they may be machined from a single sheet of metal, or the two may be welded or otherwise adhered together. Under these circumstances all but one of the linear slots are achieved by clamping together a series of comb/separator pairs, and the remaining slot is formed by including a single plain sheet separator in the assembly.

Each plenum block 50, 51, is drilled or machined to give a set of hollow plenum chambers 54 each of cross-sectional area "A" (measured transversely to the long axis). Drilled orifices or nozzles 55, each of cross-sectional area "a", connect the plenum chamber, via a respective drilled or machined passage 56 in the separator plate 52, to the relevant space 57 between adjacent teeth of the comb 53.

Figure 5:
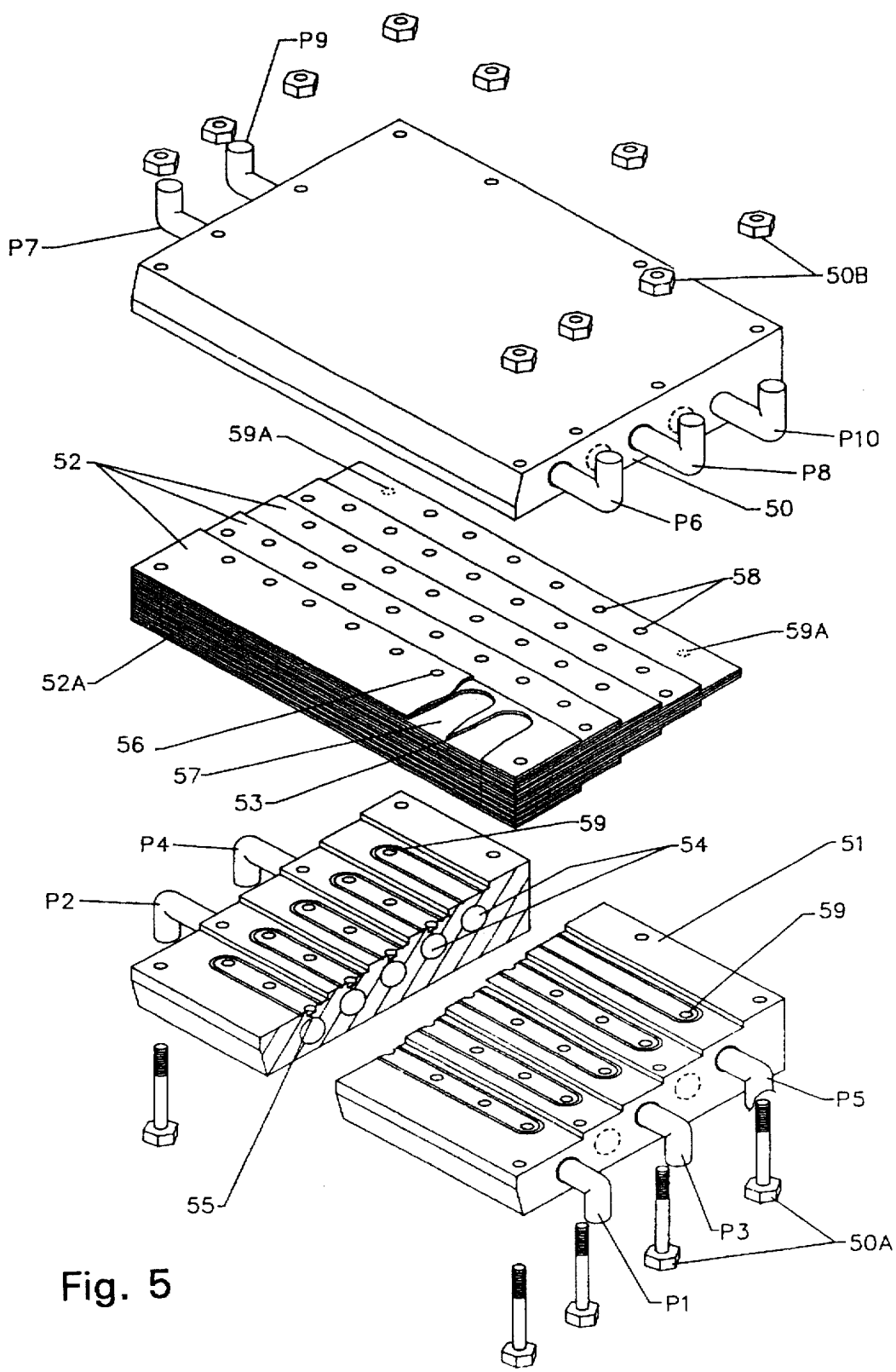
FIGS. 5, 6, 7 and 8 are more detailed schematic views of individual components of burners and burner assemblies in accordance with the invention.

The two plenum blocks 50, 51 of a short burner of the type illustrated in FIG. 5 may be held together by bolts 50A and nuts 50B as shown, such that the gases introduced to the plenum chambers 54 from respective supply pipes, P1 to P10 in the blocks 50, 51 emerge from a series of well-defined and uniform slots at the front face of the burner. Gas-tight sealing may be achieved between the plenum blocks and the various separators by using O-rings or alternative gaskets, and the assembly is substantially leak-free.

A long burner requires a relatively substantial construction of the blocks 50, 51, or alternatively the two plenum blocks may be compressed together at a number of places along their length by means of a series of clamps, pusher screws, hydraulic rams or similar means, in order to ensure good sealing at all points within the burner, and precision of the assembly of slots at the front face 52A.

Figure 6:
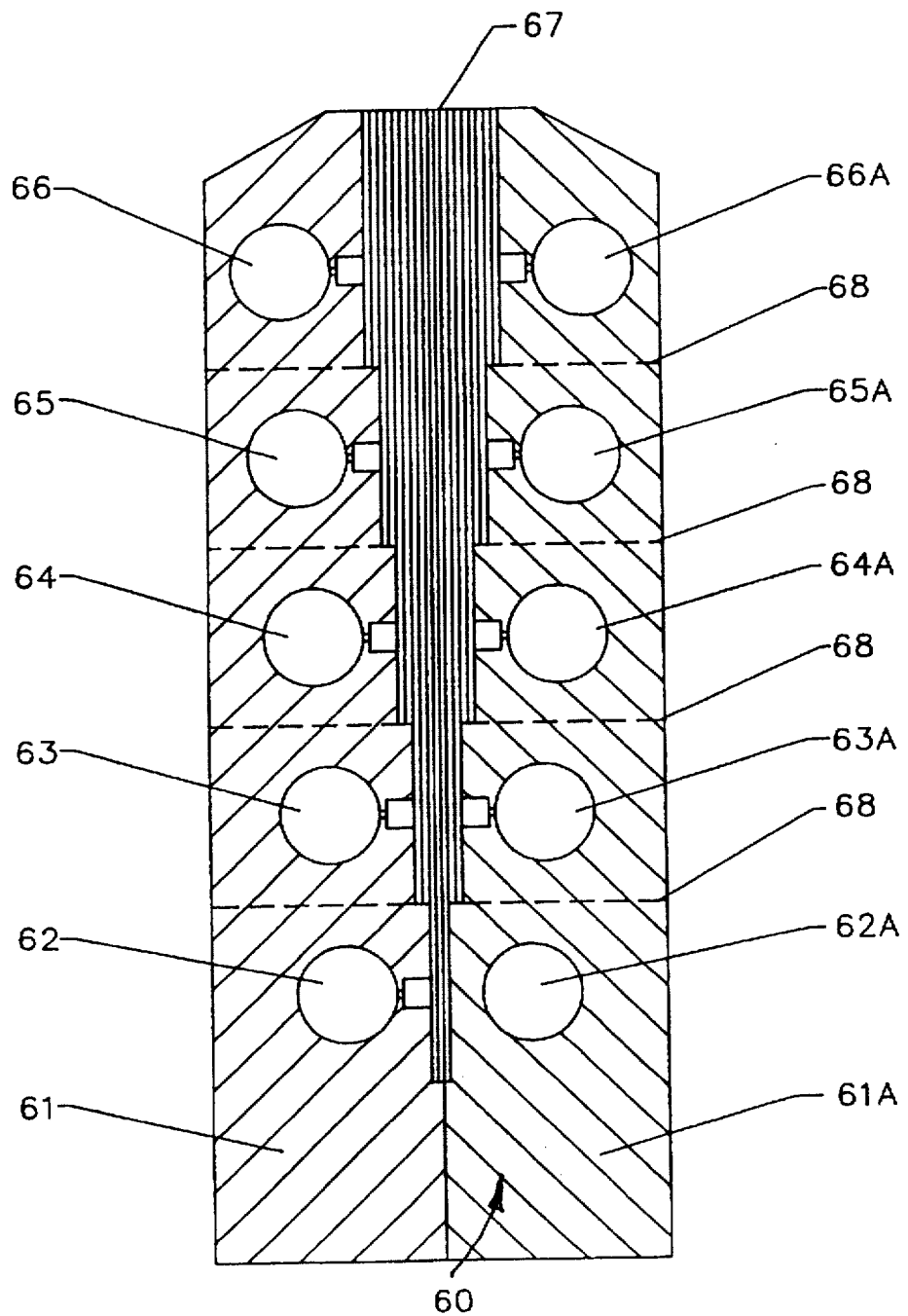

A burner 60 which comprises an assembly of such modular components, is shown in mid-section in FIG. 6. As may be seen from this diagram, plenum blocks 61 and 61A are of substantially similar construction. The gases fed to the central slot of the burner, usually comprising the silica precursor or feedstock eg. siloxane vapour optionally mixed with carrier gas (e.g. nitrogen or argon), are introduced via plenum chamber 62. Referring to FIG. 5, these gases enter the slot via holes 58. Holes 59, shown in plenum block 51, may conveniently be fed with inert gas introduced to the plenum block via pipe P5, and led to the extremities of the central slot via holes 59A (shown dotted). This arrangement ensures that the outermost inter-comb passages of the central (silica precursor) slot of the burner are fed with inert gas (eg. via 62A), and this prevents premature oxidation of the precursor by entrained air, which would otherwise cause deposition of silica on the face of the burner.

As may be seen the combs and separators forming the outer slots are progressively shorter as one moves outwards from the centre of the burner, so that the separator/comb assembly has an approximately triangular cross-section. The slots immediately to either side of the central slot carry a gas which is substantially unreactive to the silica precursor, and in the case of a siloxane feedstock, methane, hydrogen or nitrogen or their mixtures may be used, as may a range of other inert or combustible gases or gas mixtures. These gases, which may be referred to as shield gases, are fed to the next pair of plenum chambers 63, 63A. Proceeding outwards, the next pair of slots may be supplied with oxygen provided by plenum chambers 64, 64A.

While an arrangement of five parallel slots may be used to synthesise silica soot, and indeed provides the primary synthesis flame of a burner of this type it has been found preferable to supply additional heat via further slots. Thus to either side of the above arrangement is fed a fuel gas eg. methane or hydrogen, from plenum chambers 65, 65A, and oxygen via plenum chambers 66, 66A. Additional pairs of heater gas slots may be provided if required, supplied by additional pairs of plenum chambers on either side of the burner. Despite the presence of such additional slots, the central five slots may still be regarded as comprising the primary synthesis burner.

Generally the slots which together make up the efflux zone 67 of the burner 60 run substantially the full length of the burner, and each slot is supplied with gas via a substantial number "n" of equal inter-tooth spaces, each supplied with gas emerging from the respective one of the "n" equal orifices 55. To ensure approximately uniform distribution of gas from the plenum to the array of orifices it is necessary to ensure minimal pressure drop along each plenum, and for this purpose in has been found to be beneficial to ensure that the cross-sectional area "A" of each chamber in a plenum block is at least 10 times the sum of the cross-sectional area "a" of the orifices ie. A >10n×a, where "n" is the number of orifices of area "a".

The separators must be adequately refractory, thermally conductive and oxidation resistant. The separators 52 (and combs 53) may be made from fused quartz, vitreous silica, or certain ceramics, for example silicon carbide, silicon nitride or sialon, however these materials are relatively costly and difficult to fabricate and handle, particularly for the large burners within the scope of the invention. It has alternatively been found acceptable to make these components from metal but due to the thermal load on the separator, and other constraints, careful choice of metal is necessary. It is preferable that the metal comprising a separator be of low expansion coefficient, and titanium has been found to be a suitable metal for this purpose, but other metals and their alloys are expected to be usable. Where the chosen metal is reactive with one or more of the gases fed to the burner, it may be desirable to protect the metal with a suitably refractory coating. If the chosen metal has too high an expansion coefficient the front edge may distort in the heat of the flame. Under these circumstances it is advantageous to provide slits in the front edge of each separator 52, to permit a limited expansion of the front edge relative to the cooler regions of the separator. It is advisable to ensure that these slits are placed so as to be covered by a comb-tooth 53 to minimise the risk of gas leaking to a neighbouring channel via such slits.

In an alternative arrangement within the scope of the present invention, and useful where a long separator assembly is required but this is to be made from materials which are difficult to manufacture or to machine in long lengths (e.g. vitreous silica or ceramic) it may be useful to arrange that the separator assembly is comprised of a number of short sub-assemblies arranged contiguously end-to-end, so as to give a substantially uniform sheet-like flame. Clearly the gas seals must be appropriately designed to ensure that the array of separator sub-assemblies is fed with respective gas flows without significant leakage of gas.

With such an arrangement it may be advantageous to arrange a small gap between neighbouring sub-assemblies, at least at the edge which forms the hot face of the burner, sufficient for example to accommodate the thermal expansion of the separators. Each such space may optionally be purged with inert or combustible gas, thus minimising the risk of premature mixing of the feedstock with oxygen, and the consequent risk of deposition of silica on the face of the burner.

It may be advantageous under some circumstances to arrange that the separators do not terminate in a plane at the front of the burner, as shown in FIGS. 5 and 6. For example some improvement in deposition efficiency may be observed if the central separators terminate 1-2 mm upstream of the outer separators.

The thickness of the combs defines the width of each slot, and the coma teeth 53 ensure the precision of the assembly, and maintain the spacing and parallelism of the separators 52. However it is advantageous to ensure the comb teeth 53 are of minimum width, and also that they are tapered, so that they present a minimal obstruction where the gas exits from the slot at the face of the burner. It is further advantageous to ensure that the comb teeth terminate some distance inside the slot as this permits some smoothing of the flow before the gas exits at the face of the burner.

While a burner as shown in FIGS. 5 or FIG. 6 is assembled using two monolithic plenum blocks, burners within the scope of this invention may be made more versatile, as required for experimental development, by arranging that the individual plenum chambers are contained in individual plenum blocks, e.g. by separating the plenum blocks of the burner shown in FIG. 6 at the dotted lines 68. Under these circumstances the clamping system must be more complex, and each pair of opposing plenum blocks must be separately compressed together to achieve a gas seal. Nevertheless this multi-block arrangement has proved useful in development, and is included within the scope of the present invention.

Figure 7:
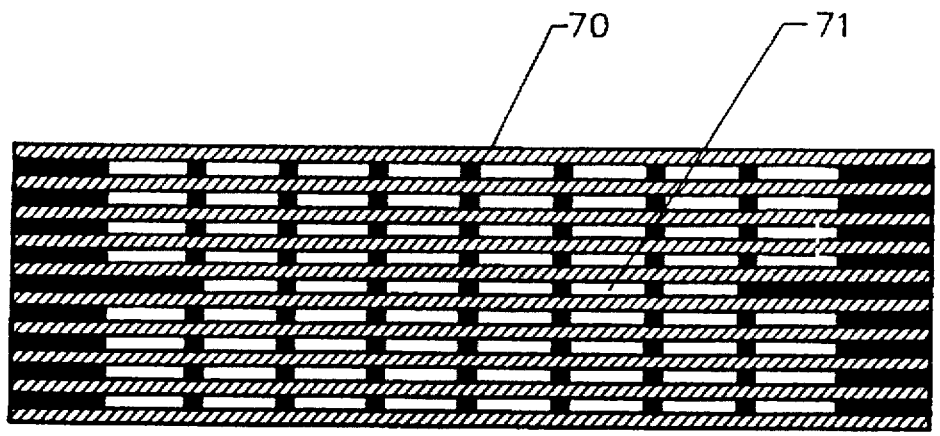
Figure 8:
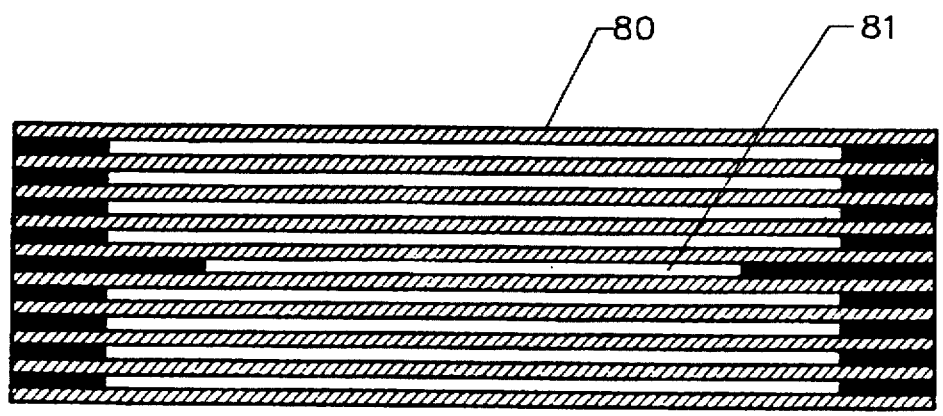

FIG. 7 shows a plan view of a cross-section of the central region of a short burner 70, at a point some distance from the face, showing the internal arrangement of comb teeth. The combs for the central (silica precursor) slot, 71, may advantageously be machined to give only (n–2) internal channels leading to the burner face, while those for the other gases may have n such channels. FIG. 8 shows a corresponding view of the face of a burner 80, where the gases emerge from continuous slots. As has been noted above and may be seen from FIG. 8, gas emerging from the precursor gas slot 81 (i.e. the central slot) is substantially surrounded at its ends, by shield gas. This prevents reaction of precursor vapour with oxygen from the ambient atmosphere at the ends of the burner, which could lead to undesirable silica deposition on the burner in these regions.

Alternatively, as described above, it has proved useful to provide the central (precursor slot), 71 with n channels, of which (n–2) are supplied with precursor fed from the lowest plenum chamber led in on one side of the burner, the remaining two channels (one on each end of the burner) being supplied with an inert gas, e.g. nitrogen, delivered using a plenum chamber provided in the opposite half of the burner.

The length of the silica precursor slot substantially determines the length over which the silica synthesis flame is generated, and thus the length of substrate over which deposition occurs at any one time. It is an advantage of burners according to the present invention that this length may be substantial compared to prior art burners.

In general, the length of the silica synthesis flame in the elongate direction of the slots is at least 5 times, advantageously 10 times and preferably more than 50 times the total thickness of the primary synthesis flame at the face of the burner, the thickness of the primary synthesis flame being taken as the sum of the width of each of the central five slots plus the width of the separators between them.

There is a degree of latitude in setting the spacing between the comb teeth 53, but 25 mm represents a convenient spacing demonstrated in practice. While a burner in accordance with this invention is designed to give a deposition flame which is substantially uniform along its length, there may be some minor non-uniformity arising from the presence of comb-teeth in the internal channels of the burner. If this is a problem the burner can be oscillated slightly in use, with an amplitude equal to at least one comb-tooth spacing, ie with a teeth spacing of 25 mm it is useful to oscillate the burner with an amplitude of at least 25 mm, or for better averaging 50 mm or even 100 mm may be preferred. Clearly however, the larger is the amplitude of this oscillation, the larger is the extent of the zone of tapering thickness at each end of an otherwise uniform thickness deposit on the substrate.

For optimum performance it has been found preferable to avoid major discrepancies between the velocities of gases emerging from neighbouring slots, and in some circumstances it may be found beneficial to chamfer or otherwise shape the edges of the separators 52 in order to achieve specific gas flow characteristics in the mixing region, e.g., to minimise potentially deleterious recirculation of reagent gases in this zone.

Alternatively, or additionally, it may be advantageous to incorporate one or more heat transfer channels in each plenum block in the region of the face of the burner. By circulating an appropriate heat transfer fluid in these channels excess heat from the synthesis flame and deposition facility may thus be removed in a controlled manner, or additional heat (e.g. to prevent deposition on the burner) supplied in a controlled manner.

For use with precursor feedstocks which are relatively involatile it has been found advantageous to heat the burner 60 by means of electric heaters, (e.g., set into channels within the plenum blocks), and to monitor and control these heaters via thermocouples (e.g., inserted into the plenum blocks). In the interests of clarity these are non shown in FIGS. 5 or 6. Furthermore, when using such a heated burner, it may be advantageous to preheat some or all of the gases supplied to the burner.

A major advantage of a burner according to the present invention is that it has been found to be relatively easy to scale-up in a linear fashion. Thus, using the above method for calculating plenum chamber diameter, it is possible to select the cross-sectional area of the chamber 54 in the plenum block, together with the size and spacing of the orifices, so as to be suitable for a slot length of for example 2000 mm. Optimisation of the dimensions of all the components of such a large burner, i.e. the choice of number of slots, of feed gases and feed gas flows, of their distribution between the slots, of the optimum comb thicknesses (and corresponding slot-widths), would be a lengthy and expensive exercise for such a large burner. However it is possible to build a relatively short linear burner (e.g. of slot length 200 mm) with identical dimensions and characteristics (apart from total length), and to optimise such a short linear burner. Thereafter construction of a full-length linear burner is simply a matter of axially extending the dimensions of the short burner, since all the other dimensions are substantially optimised.

The invention will be further described with reference to the following Examples.

EXAMPLE 1

A short linear burner according to the present invention was constructed and used as follows.

The burner was a nine-slot version, as shown in FIGS. 4–6. The plenum blocks were 240 mm long, and made from stainless steel. The plenum blocks were machined to give a series of hollow plenum chambers of internal diameter 15 mm, cross sectional area 177 mm2. Gas entered each plenum chamber via a connection at one end, and left via a number of drilled outlets (see 55, FIG. 5). The lowest (silica precursor feed) plenum chamber had six such outlets and the remaining plenum chambers eight outlets each. Each block was machined to accommodate a heating element and thermocouple. The diameter of each drilled outlet was 1 mm, thus the ratio of plenum chamber cross-sectional area to total outlet area was 36.5 for the bottom plenum chamber, and 28.1 for the remaining plenum chambers.

The separators were made from titanium sheet, 1.5 mm thick, and the combs were made from stainless steel. The comb defining the central slot had six spaces, while that defining the remaining slots had eight spaces, as shown in FIG. 7. The combs terminated within the burner. The thickness of the respective combs determined the slot widths and are shown in Table 1, (where Slot Number is as shown in FIG. 4).

The burner was heated to a temperature of 150° C., and then supplied with gases and OMCTS vapour in the quantities shown in Table 1. The flame was substantially uniform in a lengthwise direction. The thickness of the primary flame (sum of widths of the central five slots plus the thickness of the intervening separators) was 13 mm, while the length of the synthesis flame; (length of the siloxane precursor slot) was 154 mm, giving an aspect ratio of 1:12.

The burner was mounted facing a rotating fused quartz mandrel or bait piece of diameter 100 mm, and was used to deposit silica soot on this mandrel, while traversing in a reciprocating fashion along an axis parallel to the axis of rotation of the mandrel with an amplitude of 1 meter. As silica soot built up on the mandrel, the burner was withdrawn to maintain a burner-to-bait piece separation of 85 mm. Deposition occurred at an average rate of 10.4 g/min, 83% collection efficiency in terms of silica equivalent.

TABLE 1

| Slot Number | Slot Width (mm) | Gas | Quantity |
|---|---|---|---|
| 41 | 1 | OMCTS | 1.1 kg/h |
|  |  | $N_2$ (Carrier) | 12.0 l/min |
| 42,42A | 1 | $CH_4$ | 7.9 l/min |
| 43,43A | 2 | $O_2$ | 65.8 l/min |
| 44,44A | 1 | $CH_4$ | 22.1 l/min |
| 45,45A | 2 | $O_2$ | 41.4 l/min |

EXAMPLE 2

A long linear burner was constructed in a similar manner to that described in Example 1, and with similar cross sectional dimensions, however the length of the plenum blocks was 1985 mm. The internal diameter of each plenum chamber was 28 mm, giving a cross-sectional area of 616 mm$^2$. The bottom (silica precursor feed) plenum chamber had seventy-three outlets (of diameter 1 mm) while the remaining plenum chambers had seventy-five outlets each of 1 mm diameter. The ratio of plenum chamber cross-sectional area to total outlet area was thus 10.7 for the bottom plenum chamber, and 10.45 for the remaining plenum chambers.

The separators and combs were of similar design to those in Example 1, but longer, to match the longer plenum blocks. The comb defining the central slot had seventy-three spaces, while those defining the remaining slots had seventy-five spaces. The comb thicknesses were as in Example 1.

The burner was heated to a temperature of 150° C. and supplied with gases and OMCTS vapour in the (typical) quantities shown in Table 2. The flame was again substantially uniform in a lengthwise direction. The thickness of the primary flame as defined above was again 13 mm, while the length of the synthesis flame was approximately 1896 mm, giving an aspect ratio of 1:145.

The burner was mounted facing a rotating fused quartz mandrel or bait piece of diameter 100 mm, and was used to deposit silica soot on this bait piece, while oscillating with an amplitude of 75 mm, and maintaining a burner-to-bait piece separation of 85 mm. Silica deposition occurred at an average deposition rate of 123 g/min, 76% collection efficiency in terms of silica equivalent.

TABLE 2

| Slot Number | Slot Width (mm) | Gas | Quantity |
|---|---|---|---|
| 41 | 1 | OMCTS | 13.4 kg/h |
|  |  | N$_2$ (Carrier) | 146 l/min |
| 42,42A | 1 | CH$_4$ | 74 l/min |
| 43,43A | 2 | O$_2$ | 400 l/min |
| 44,44A | 1 | CH$_4$ | 127 l/min |
| 45,45A | 2 | O$_2$ | 260 l/min |

These examples of linear burners demonstrate the effectiveness and versatility of burners according to the present invention. While the use of OMCTS is described above, it is evident that burners of comparable construction can be built to handle alternative silicon-containing precursors, including halogen-containing silicon compounds. By using the modular construction described above, optimisation of slot widths etc., is readily achieved. Although a burner of aspect ratio 1:145 is described above, higher aspect ratio burners may be used if desired, and burners according to the invention may be mounted end-to-end to provide deposition along any length of substrate.

Other variations of the invention will be apparent to those skilled in the art. Thus, for example the array of parallel linear slots at the exit face of the burner, can be defined by an array of essentially planiform or tapered separators held apart by inserts each of which may take the form of a comb-like structure as described but could be achieved by other means, e.g. by milling such a structure in the surface of the separator, or by packing the space between the separators with capillary tubes etc.

In a further modified arrangement, the assembly of separator plates comprises a stack of plates of similar size and shape (e.g. rectangular), each provided with gas passages extending normal to and leading to the exit face and feed holes transverse to the gas passages for supplying gas flows from the plenum chambers in the casing parts to the respective gas passages making up each slot. Thus, for the innermost separator plate just one row of feed holes is required but for each separator plate outwardly thereof at least one additional row of feed holes is needed for each slot inwardly thereof that needs to be fed with a gas flow through the respective separator plate. For example with a five slot burner, the separator defining the innermost slot will have its gas passages fed by a lowermost row of holes. The next separator will have a lowermost row of holes to feed the innermost slot and a second row of holes to feed the intermediate slot it defines. The outermost separator will have three rows of holes, the lowermost feeding the innermost slot, the next row feeding the intermediate slot and the uppermost feeding the outermost slot it defines. The intermediate and outermost slots on the other side of the innermost slot can similarly be fed through two rows of holes provided in the other outermost separator. Clearly if purely one-sided gas supply is required for all the slots of the five slot burner, five rows of holes will be required in the first separator plate to be encountered by the gas flows, four rows in the next and so on until just the one row (usually the lowermost) remains to feed the gas passages constituting the remote outermost slot.

By making the burner assembly demountable, interchange of parts and, if required, adjustment of the critical dimensions of the burner can easily be secured. If required the stack of separator/comb plates may be pre-assembled, and even held together using a suitable inert adhesive, e.g. silicone resin, to facilitate handling, and minimise the risk of gas leakage.

Burners according to the invention may be used for the synthesis and deposition of silica from two broad types of silicon-containing vapour feedstock, or silica precursor. The first, and currently the most commonly used, comprises silicon tetrachloride, which being unreactive with oxygen at ambient temperatures, may be fed alone or using oxygen as carrier gas to the precursor feedstock slot of the burner.

On either side of this slot, and its flow of precursor vapour, are provided shield gas flows which do not immediately react with the precursor to form silica, such shield gas flows may thus be of inert gas such as nitrogen, argon or helium, or may comprise an oxidising gas such as oxygen. Alternatively mixtures of these gases may be employed.

Thereafter, moving outwardly from said shield gas flows, and on either side of the burner, is provided
  a flow of combustible gas, typically hydrogen or methane, (these various flows together comprise the primary synthesis flame for this burner),
and optionally,
  a further flow of oxidising gas, e.g. oxygen,
and again optionally,
  further alternating flows of combustible and oxidising gases,
the above flows of reactant gases optionally being separated by flows of inert gas (e.g. nitrogen, helium, argon) or alternatively diluted with such cases.

The second group of precursors comprises those silicon-containing vapour feedstocks which combine energetically with oxygen, and are thus regarded as combustible. This group includes the preferred halogen-free feedstocks such as the volatile siloxanes and alkoxysilanes described above, and also certain halogen-containing combustible (e.g. hydrogen-containing) compounds, such as for example trichlorosilane and dimethyidichlorosilane. These being reactive with oxygen, must be supplied to the feedstock slot of the burner, either free from carrier gas, or optionally diluted in a non-oxidising carrier gas, i.e. an inert gas, such as nitrogen, argon, or helium, or a reducing (combustible) gas, such as hydrogen or methane. Alternatively mixtures of these gases may be employed.

On either side of the feedstock slot, and its flow of precursor vapour, is provided a shield gas flow which does not immediately react with the precursor to form silica, such shield gas flow may thus be an inert gas such as nitrogen, argon or helium, or may comprise a reducing (combustible) gas such as hydrogen or methane, or a mixture of inert and reducing gases.

Thereafter, moving outwardly from said shield gas flow, and on either side of said flows, is provided a flow of oxidising gas, typically oxygen, (these various flows together comprise the primary synthesis flame for this burner), and optionally, a flow of combustible gas, typically hydrogen or methane, and again optionally, further alternating flows of oxidising and combustible gases, the above flows of reactant gases optionally being separated by flows of inert gas (e.g. nitrogen, helium, argon) or alternatively diluted with such gases.

We claim:

1. A linear burner for the synthesis of silica by vapour-phase reaction of a silicon-containing feedstock in a flame and for the deposition of the resulting soot on a bait piece held adjacent to the burner, which burner comprises at least five slots opening to an exit face of the burner and extending side-by-side in the elongate direction of the linear burner, and includes means to supply a separate gas flow to each of said slots, wherein said supply means comprises an assembly of separator plates disposed between opposed casing parts, the separator assembly defining the slots and at least one of the casing parts defining at least part of a respective plenum chamber for each gas flow, each plenum chamber communicating with a different one of said slots in the separator assembly.

2. A burner as claimed in claim 1, wherein plenum chamber parts are provided in each casing part and the plenum chamber feeding an outermost slot is situated nearest to the exit face of the burner while that feeding the or each innermost slot is situated furthest from the exit face, such that a slot in an inner region of the burner is of greater depth, measured in the direction of flow of gas within the slots, than a slot which is in an outer region of the burner.

3. A burner as claimed in claim 2, wherein the separator assembly is of a generally triangular cross-section.

4. A burner according to claim 1, wherein the separator assembly comprises a stack of separator plates each running substantially the full length of the burner, a plurality of pairs of separator plates in the stack providing widthwise perimeter-defining limits of the different slots and intermediate at least some of said pairs of separator plates, comb plates to control gas flow within the slot whose perimeters are defined by the said pairs of separator plates, and to maintain said separator plates at a controlled separation.

5. A burner as claimed in claim 4, wherein one separator plate and one comb plate are combined to form a separator/comb pair, the separator assembly comprising a plurality of separator/comb pairs which plurality of separator/comb pairs are clamped between said two casing parts.

6. A burner according to claim 1, wherein at least one casing part comprises a plenum block providing a set of hollow plenum chambers each of cross-sectional area "A" measured transverse to the elongate direction of the linear burner, each plenum chamber being closed by a respective part of the separator assembly, the gas issuing from each plenum chamber into the respective part of the separator assembly via "n" orifices each of cross-sectional area "a" and in that $$A > 10n \times a.$$

7. A burner as claimed in claim 4, wherein the outermost separator plates of the stack terminate downstream, in the gas flow direction through the burner slots, of at least some of the separator plates disposed between said outermost separator plates.

8. A burner according to claim 4, wherein each comb plate defines a plurality of comb teeth each narrowing in the direction of gas flow through the respective burner slot.

9. A burner according to claim 1, wherein at least one casing part is divided into individual plenum blocks separately pressed together in a gas sealing relationship around the separator assembly.

10. A burner according to claim 1, wherein the separator assembly is constructed from a multiplicity of substantially similar sub-assemblies arranged contiguously end-to-end in a linear array.

11. A burner according to claim 1, wherein at least two of the separator plates, are tapered, in the direction of gas flows within the slots, so that the gas flows leaving the outermost slots of the burner converge toward the gas flow or flows leaving the or each innermost slot of the burner.

12. A burner according to claim 1, wherein the or each innermost slot has end regions thereof supplied with a gas flow different from the gas flow supplied to the remaining mid-region of the or each innermost slot.

13. A burner according to claim 1, wherein the length of each slot is more than 50 times the overall width of the at least five separate slots.

14. Apparatus for manufacturing a vitreous silica article, comprising:

a linear burner which comprises at least five slots opening to an exit face of the burner and extending side-by-side in the elongate direction of the linear burner, and means to supply a separate gas flow to each of said slots, wherein said supply means comprises an assembly of separator plates disposed between opposed casing parts, the separator assembly defining the slots and at least one of the casing parts defining at least part of a respective plenum chamber for each gas flow, each plenum chamber communicating with a different one of said slots in the separator assembly, and a bait piece situated adjacent to the linear burner to enable deposit of silica synthesized in a reaction in the flame of the linear burner wherein at least one of the innermost slots of the burner is adapted to carry a central flow of a hydrolyzable silicon containing feedstock, said at least one innermost slot being surrounded on either side by further slots adapted to carry gas flows, which do not react directly with the central flow, the latter two flows being flanked outwardly by two further slots adapted to carry further flows of another gas such that the combined flows lead to combustion via the creation of a primary synthesis flame and the formation of a sheet-like plume of silica fume suitable for depositing silica soot on the bait piece, the overall dimension of the primary synthesis flame in the elongate direction of the slots being at least 5 times the total thickness of the primary synthesis flame at the exit face of the burner.

15. The apparatus according to claim 14 wherein said overall dimension of the primary synthesis flame in the elongate direction of the slots is at least 10 times the total thickness of the primary synthesis flame at the exit face of the burner.

16. The apparatus according to claim 14 wherein said overall dimension of the primary synthesis flame in the elongate direction of the slots is at least 50 times the total thickness of the primary synthesis flame at the exit face of the burner.

17. The apparatus according to claim 14, comprising means for supplying a halogen-free silicon-containing feedstock.

18. The apparatus according to claim 14, wherein said at least one innermost slot is adapted to carry a linear or cyclic polysiloxane vapor feedstock and is flanked outwardly by slots adapted to deliver an inert or combustible sheath gas, again flanked outwardly by slots adapted to deliver an oxidizing gas, optionally flanked outwardly by alternate slots adapted to carry further flows of combustible and oxidizing gases, said flows of combustible and oxidizing gases being optionally diluted with inert gas, and said slots being optionally interspersed by slots adapted to deliver inert gas.

19. The apparatus according to claim 16, wherein the slots adapted to deliver oxidizing gas are flanked outwardly by alternate slots adapted to carry further flows of combustible and oxidizing gases, said flows of combustible and oxidizing gases being optionally diluted with inert gas, and said slots being optionally interspersed by slots adapted to deliver inert gas.

20. The apparatus according to claim 14, comprising means for supplying a chlorosilane feedstock.

21. The apparatus according to claim 14, comprising means for supplying a siloxane feedstock.

* * * * *

UNITED STATES PATENT AND TRADEMARK OFFICE
CERTIFICATE OF CORRECTION

PATENT NO. 5,735,928
DATED : April 7, 1998
INVENTOR(S) : Ian George Sayce, et al.

It is certified that error appears in the above-indentified patent and that said Letters Patent is hereby corrected as shown below:

Title Page, Section [75] Inventors:, replace "Willikam" with -- William --.

Col. 2, line 45, replace "To" with -- to --.

Col. 3, line 13, replace "non" with -- not --.

Col. 3, line 28, replace "no" with -- to --.

Col. 3, line 29, replace "no" with -- to --.

Col. 4, line 24, replace "pertain" with -- permit --.

Col. 7, line 26, replace "sloes" with -- slots --.

Col. 9, line 32, replace "in" with -- it --.

Col. 10, line 21, replace "coma" with -- comb --.

UNITED STATES PATENT AND TRADEMARK OFFICE
CERTIFICATE OF CORRECTION

PATENT NO. : 5,735,928
DATED : April 7, 1998
INVENTOR(S) : Ian George Sayce, et al.

It is certified that error appears in the above-indentified patent and that said Letters Patent is hereby corrected as shown below:

Col. 11, line 49, replace "non" with -- not --.

Signed and Sealed this

Eleventh Day of August 1998

Attest:

BRUCE LEHMAN

Attesting Officer      Commissioner of Patents and Trademarks